2,956,885
CHEESE PRODUCTS AND METHOD FOR THE MANUFACTURE THEREOF

Zola D. Roundy, Clarendon Hills, and Na Ray H. Ormond, Chicago Heights, Ill., assignors to Armour and Company, Chicago, Ill., a corporation of Illinois No Drawing. Filed Dec. 3, 1957, Ser. No. 700,279

3 Claims. (Cl. 99—116)

This invention relates to a novel cheese product and to a method for the manufacture of such a novel cheese product. The invention is particularly related to a dried baker's-type cheese product and to the preparation of a dried baker's-type cheese product.

The research efforts of the cheese industry have long been directed toward developing rapid and economic methods of cheese manufacture. That these efforts have been without significant results in the field of baker's cheese manufacture is illustrated by a brief survey of the current manufacturing methods. Typical modern processes are much the same as the ancient processes brought to this country many years ago by immigrants from Europe. In such processes milk is ordinarily first skimmed and pasteurized, then inoculated with a starter culture of an acid forming microorganism, usually a mixture of the species S. lactis and either Leuconostoc citrovorum or Leuconostoc paracitrovorum, and then the inoculated mixture is allowed to ferment for about 16 to 18 hours. Rennet is usually added to promote the formation of a larger curd. Much difficulty is often encountered in controlling the conditions of fermentations so that a curd of desirable size and texture is formed. The separation of curd and whey produced by fermentation processes has always been complicated by the nature of the curd precipitate formed, since that precipitate often encloses whey within the curd.

The fermentation process, which involves the growth and nurture of a starter culture of lactobacillus, is usually complicated by the concomitant growth and development of undesirable organisms and materials, such as, for instance, the gas forming bacteria, bacteriophages, antibiotics, etc. The fermentation process requires the preservation and nurture of a pure starter culture; this is a most sensitive and critical microbiological process in itself.

The old manufacturing methods are time consuming in at least two distinct operations, the first being the time required for the development of sufficient acidity by the fermentation processes, and the second being the period required to separate the curd and whey by drainage through unbleached muslin or similar material. These processes are also unsatisfactory in that the baker's cheese product varies considerably in flavor, texture, etc. from batch to batch, thereby unnessarily complicating its utilization. Beyond these disadvantages, the baker's cheese, being a soft wet curd, is very subject to continued bacterial action which leads to spoilage and changes in composition and flavor changes, all of which lead to considerable waste. To prevent these undesirable occurrences, the wet baker's cheese is sometimes stored under carefully controlled refrigeration conditions. Even under desirable refrigeration conditions, which are costly in themselves, the baker's cheese product can only be kept for very limited periods of time.

Accordingly, it is an object of the present invention to provide a rapid process for the manufacture of dried cheese products. It is a particular object of this invention to provide a method for the manufacture of a dried baker's-type cheese product. It is also an object to provide a dry baker's-type cheese product which is very stable during extended periods of storage. It is also an object of the invention to provide a baker's-type cheese product which does not require refrigeration during storage. It is another object of the invention to provide a method for the manufacture of dried cheese products wherein the fermentation processes and accompanying use of starter cultures and rennet is eliminated. It is a particular object of this invention to provide an acid precipitation process for the manufacture of dried soft-type cheese products. It is also an object of the invention to provide a continuous process for the manufacture of a dry baker's-type cheese product.

In the practice of the invention it is customary to remove the butter fat from the milk starting material. In the preparation of baker's cheese, the milk mixture generally contains either no fat or merely a trace of fat. Also, in the process of the invention it is customary and desirable to pasteurize the milk starting material to improve its flavor and keeping qualities. Since the process requires only a very short period of time, pasteurization may not be necessary since insufficient time is allowed during the manufacturing process for undesirable organisms to develop. The milk is also generally heated in the "hot well" during the condensing process thereby destroying viable organisms and inactivating enzymes which may be present in the milk.

Instead of using rennet or starter culture as in the usual procedures, we have found it desirable to acidify the milk and cream mixture to a pH within the range of from about 4.0 to about 4.9 and preferably within the pH range of from about 4.5 to about 4.7. A pH of about 4.6 has been found to be preferred. The temperature of the milk during the acidification step should be within the range of from about 35 to 120° F. For reasons discussed below it is preferred to perform the acidification with the milk at a temperature within the range of from about 40 to 60° F. A temperature of about 50° F. has been found to be very satisfactory. The acidification step is accomplished by addition of about .3 to .4% by weight of an edible acid dissolved in water. In this step any edible acid, such as citric acid, phosphoric acid, acetic acid, lactic acid, gluconic acid, etc., or any mixture of said acids, may be used. Although satisfactory baker's-type cheese can be made in a process wherein the acidification is a pH within the range mentioned above, it has been found desirable to acidify the mixture to a point slightly beyond the isoelectric point or to about a pH of 4.5 to 4.6. The precipitation of the curd is accomplished in a very short time, as soon as the mixture is completely and uniformly acidified. Even if the process is being carried out in a batchwise process, it has been found desirable to agitate the milk mixture during the addition of the aqueous solution of the acid.

We have found that the temperature at which the best yields are obtained so far as particle size is concerned is about 50° F. When the milk and acid mixture is at a temperature below 45° F., the reaction of the acid on the casein of the milk is retarded. At a temperature of over 50° F. the acid reaction is fairly rapid, thereby creating particles of increased size. The faster the agitation during the acidification step, the smaller is the size of the particles produced. However, at temperatures higher than those within the preferred range, i.e., from 60° F. to 120° F., the reaction is so fast that even with rapid agitation it is difficult to produce small, readily spray-dried casein particles. If such high temperatures are used in the precipitation step, it is desirable to reduce the particle size of the curd before it is dried. A colloid mill or other suitable means can be used to accomplish the particle size reduction.

The percentage of total solids in the acidified milk mixture also has an effect upon the particle size of the precipitated curd. Skim milk, which has a total solids content of approximately 9%, produced a very small particle size of precipitate when precipitated at cold temperatures with fast agitation. However, this 9% solution produced an acidified milk solution requiring large amounts of moisture removal to produce a powder. Milk condensed to a solids content of about 40% or greater created a slurry too viscous to handle when the casein was reacted with the acid. A total solids content of about 20% to about 30% appears to be optimum. It is desirable to use as high a solids concentration as possible since it is less costly to remove moisture from the product by condensation procedures prior to acidification than by drying procedures after the curd is precipitated. The upper limit of concentration is determined by the viscosity of the solution since it is necessary to have a milk solution which can be agitated sufficiently to insure uniform admixture of the milk and acid solutions.

Rather than precipitate the milk in a batch process it has also been found desirable to meter the acid solution into the milk solution in a continuous process. After the acid is metered into the milk solution, the mixture of milk and acid solution is kept under constant agitation to insure uniform admixture of acid in milk and thereby to produce particles of uniform size.

After precipitation of the curd, the curd-whey solution is at a pH within the range of from about 4.0 to about 4.9. This solution is then dehydrated by any suitable means, such as by conventional spray drying equipment. We have found that spray drying equipment having a nozzle orifice of from about 0.02 to 0.04 inch in diameter to be very desirable. As in other spray drying procedures, we have found it desirable that the inlet temperature of the solution into the spray dryer be in excess of 212° F. A preferred inlet temperature has been found to be about 250° F. We have also found that the outlet temperature within the range of from about 138 to 155° F. will result in a desirable product having only about 3% moisture. In one case the outlet temperature was kept at about 180° F. and the dried product was found to have about 2½% moisture.

As mentioned above, the preferred method of drying the acidified milk solution is by spray drying. We have however found other drying techniques, such as freeze drying and roller drying, to be applicable. Freeze drying is less desirable than spray drying as it is quite costly; roller drying has the disadvantage of necessitating an additional step, that of powdering the dried product.

We have found by means of laboratory tests that the spray dried baker's-type cheese product is improved in its baking characteristics when either natural or synthetic stabilizers are added. In order to determine the best combination of precipitated cheese and stabilizer, many stabilizers were tested. These tests are reported in the following table:

TABLE I

| Stabilizer | Best Amount in Percent of Cheese Powder | Volume | Flavor | Texture |
| --- | --- | --- | --- | --- |
| Carboxymethyl Cellulose | 4.4 | large | good | Slightly moist. |
| Locust Bean Gum | 3.5 | medium | excellent | creamy. |
| Instant Starch | 12.5 | do | good | smooth. |
| Gum Tragacanth | 2.8 | do | do | grainy. |
| Karaya gum | 2.8 | do | fair | Do. |
| Gelatin (250 Bloom) | 2.5 | small | resembling gelatin. | firm. |
| Sodium Carrageen | 3.3 | do | fair | wet. |
| Sodium Alginate | 3.3 | medium | do | Do. |
| Guar Gum | 3.3 | large | acid salt | cracked. |
| Methylcellulose | 3.3 | small | fair | wet. |
| Regular Starch | 12.5 | do | do | gummy. |
| No Stabilizer | 0 | do | good | wet. |

Although some of the stabilizers produced a satisfactory baker's-type cheese base, it was found that by blending the stabilizers many objectionable features of the individual stabilizers could be eliminated. As indicated in Table I, the three best stabilizers were carboxymethyl cellulose, locust bean gum, and instant starch. We have found that a very desirable stabilizer can be formed by mixing into the cheese approximately 3.3% of carboxymethyl cellulose in 6.7% of instant starch, thus making a final cheese product containing approximately 10% of stabilizer. This combination was found to produce the best cake volume as well as having many other excellent baking characteristics.

A baker's-type cheese blend containing the stabilizer (an instant starc hand carboxymethylcellulose combination) in the amount of about 10% by weight of the blend was placed in sealed cans and stored at 40° F., 72° F., and 100° F. for storage tests. It was found that good flavored cheese cakes can be produced from powdered cheese product that had been in storage in excess of eight months. Taste panel results and chemical tests showed that the concentration of hydroxy-methylfurfural formed show that the temperature had a greater deterioration effect on flavor than a high moisture content in the powder. Four months at 100° F. was required to produce even a slight storage flavor that was detectable by a taste panel; however, even this slight storage flavor was not found to be objectionable. Storage of the dehydrated cheese product at 40° F. or lower holds flavor deterioration to a negligible value. The cheese product keeps three to four times longer at 70° than at 100° F. Baker's-type cheese powder that has a moisture content of about 3% or less and is stored in a cool dry place will have no noticeable or significant change in flavor even after several months storage.

The chemical composition of the product of this invention and of the conventional wet baker's cheese is as follows:

TABLE II

Chemical composition of baker's-type cheese products

| Constituents | Conventional Wet Baker's Cheese | Dried Cheese Product |
| --- | --- | --- |
| | Percent | Percent |
| Moisture | 76.5 | 3.2 |
| Protein | 19.5 | 33.9 |
| Lactose | 2.0 | 44.4 |
| Fat | 0.5 | 0.9 |
| Ash | 1.5 | 7.6 |
| Stabilizer | none | 10.0 |

The process of this invention may be illustrated by the following specific examples:

EXAMPLE I

Skim milk which had been heat treated to produce a phosphatase-negative milk and condensed to 36% solids was purchased from a commercial dairy. This product was delivered in good condition at a temperature of 40° F. 5,480 pounds of this 36% condensed milk was introduced into a rectangular, coil vat. However, a vertical round vat or any other shape of vat with good agitators can be used. The milk at the time of entering the vat was normal in acidity (pH 6.3). Two thousand five hundred pounds of water was added to this product, lowering the solid content to approximately 25% and adjusting the temperature to 50° F. Six hundred and fifty pounds of 15% citric acid was added, making a total of about 8,630 pounds of liquid having 23% solids to be dried.

The acid was added to the coil vat until the pH reached 5.5, indicating that most of the acid can be added to the bulk milk supply if the isoelectric point is not reached. Thousand pound quantities were removed from the coil vat and placed into vertical vats equipped with a lightning agitator. Then the rest of the acid was added to bring the pH down to 4.5. Two such thousand pound vats were used so that one could be dried while the other was being prepared; however, all acidification can be done in a single step in the large vertical vats with lightning agitators. The acid solution can be metered into the milk supply line with a Roatmeter, making the acidification operation continuous.

The product was spray dried in a concurrent drier with a 0.040 inch nozzle orifice using an inlet temperature of 260° F. and an outlet temperature of 160° F.

The 1776 pounds of dry powder was then blended by a mechanical blender in 300 pound batches, using 270 pounds of dried cheese product, 9 pounds 14½ ounces of carboxymethylcellulose (CMC), and 20 pounds 1½ ounces of instant starch. This blend was packaged in polyethylene lined drums for storage. Upon subsequent usage in commercial bakeries, this product was found to be very stable and uniformly high in quality.

EXAMPLE II

Raw skim milk was adjusted to 50° F. while 106 gms. of citric acid was dissolved in 7050 ml. of 50° F. water. This acid solution was added to 270 pounds of raw skim milk under brisk agitation to produce a pH of 4.6 and a suspended particle that was small enough to pass through a .0292 inch orifice of a spray drier. A pump pressure of 2,000 pounds per square inch was used to spray the solution into a spray drier with an inlet temperature of 250° F. and an outlet temperature of 138° F. The yield was 26 pounds of baker's-type cheese powder having a moisture content of about 3%.

EXAMPLE III

Fifty pounds of condensed milk having 30% total solids was diluted with 25 pounds of water, thereby reducing the solids to 20% and adjusting the temperature to 50° F. 35.3 gms. of hydrous citric acid was dissolved in 2350 ml. of water to form a 15% acid solution which was incorporated into the milk by rapid agitation, thereby lowering the pH to 4.5. The mixture was pumped at 2,000 pounds per square inch through a .0292 inch orifice nozzle into a spray drier.

The drier was operated with an inlet temperature of 244° F. and an outlet temperature of 144° F. The 14 pounds of powder produced was dry blended with 0.9 pound of instant starch and 0.5 pound of carboxymethylcellulose. This procedure provided a cheese product which was very stable and which, upon testing, was found to be very satisfactory in the manufacture of cheese cakes.

EXAMPLE IV

In the preparation of a dry baker's-type cheese product by continuous process, skim milk is first pasteurized at 143° F. for 30 minutes. Pasteurization may also be accomplished using a temperature of 161° F. for 16 seconds or any other equivalent procedure. The high temperature and short-time method of pasteurization is preferred. The pasteurized milk is then condensed to 20% total solids and brought to a temperature of about 50° F. A 15% solution of citric acid is then metered into the milk solution by any convenient means such as by means of a Roatmeter. The milk and acid solution mixture is then agitated vigorously immediately following the introduction of the acid solution. The addition of the acid followed by vigorous agitation produces a suspended particle in solution which is then passed directly to a spray drier. The moisture is removed by pumping the solution into the spray drier, for instance, at 2,000 pounds pressure per square inch through a 0.0292 orifice at an inlet temperature of about 250° F. and an outlet temperature of about 145° F. The outlet temperature is kept as high as possible in order to obtain a powdered cheese product with a low moisture content.

The powdered cheese product obtained from the spray drying process may be blended with a stabilizer to produce a more satisfactory commercial product. This product can then be immediately packaged for storage or shipment.

It will be understood from the foregoing specification and examples that the invention described and claimed herein is susceptible of many variations and modifications, and that all such modifications are within the spirit and scope of the invention and the claims thereto.

We claim:

1. In a process for the production of dried baker's-type cheese, the steps comprising condensing milk to a solids content of not greater than about 40%, adjusting the temperature of the condensed milk to less than about 60° F., adjusting the pH of said condensed milk to from about 4.5 to about 4.7 with an edible acid, drying the resulting curd to form a cheese powder having a low moisture content, and blending into the cheese powder a minor portion of a mixture of agents selected from the group consisting of carboxymethyl cellulose and starch.

2. In a process for the production of a dried baker's-type cheese, the steps comprising condensing skim milk to a solids content of from about 20 to about 40%, adjusting the temperature of the condensed milk to from about 40 to about 60° F., adjusting the pH of the condensed milk to from about 4.5 to about 4.7 with an edible acid, drying the resulting curd to form a cheese product containing less than about 3% moisture and blending into the cheese powder a minor portion of a mixture of agents selected from the group consisting of carboxymethyl cellulose and instant starch.

3. The process of claim 2 wherein the edible acid is selected from the group consisting of lactic acid, citric acid and a mixture thereof.

References Cited in the file of this patent

UNITED STATES PATENTS

| | | |
|---|---|---|
| 1,491,166 | Peebles | Apr. 22, 1924 |
| 2,225,506 | Otting | Dec. 17, 1940 |
| 2,518,493 | Reyniers | Aug. 15, 1950 |
| 2,604,406 | Blihovde | July 22, 1952 |
| 2,682,469 | Stuart et al. | June 29, 1954 |
| 2,714,069 | Stuart et al. | July 26, 1955 |
| 2,719,793 | Page et al. | Oct. 4, 1955 |
| 2,807,608 | Smart et al. | Sept. 24, 1957 |